United States Patent
Balamurugan et al.

(10) Patent No.: US 8,064,536 B2
(45) Date of Patent: Nov. 22, 2011

(54) LINK CALIBRATION

(75) Inventors: Ganesh Balamurugan, Hillsboro, OR (US); Joseph Kennedy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 11/964,598

(22) Filed: Dec. 26, 2007

(65) Prior Publication Data

US 2009/0168855 A1 Jul. 2, 2009

(51) Int. Cl.
  *H04L 27/00* (2006.01)
(52) U.S. Cl. ......................................... 375/295
(58) Field of Classification Search ............... 375/295, 375/362, 220; 326/68, 80, 115; 327/333
See application file for complete search history.

(56) References Cited

U.S. PATENT DOCUMENTS

| 6,304,141 B1 | 10/2001 | Kennedy et al. |
| 6,847,617 B2 | 1/2005 | Borkar et al. |
| 7,768,307 B2 * | 8/2010 | Kim et al. ............ 326/68 |
| 2008/0123792 A1 * | 5/2008 | Prete et al. ............ 375/362 |
| 2009/0153219 A1 * | 6/2009 | Wu et al. ............ 327/333 |

FOREIGN PATENT DOCUMENTS

KR  10-2007-0106424 A  11/2007

OTHER PUBLICATIONS

Office action received for Korean Patent Application No. 10-2008-133567, mailed on Feb. 28, 2011, 7 pages of Korean office action including 3 pages of English translation.
Office action received for Korean Patent Application No. 10-2008-133567, mailed on Aug. 27, 2010, 5 pages of Korean office action including 2 pages of English translation.

* cited by examiner

*Primary Examiner* — Khai Tran
(74) *Attorney, Agent, or Firm* — Erik R. Nordstrom

(57) ABSTRACT

In some embodiments, provided are methods and circuits to control the power efficiency of a transceiver or a transmitter in a scalable I/O link (a link whose bandwidth and power can be adjusted to meet changing performance demands).

19 Claims, 5 Drawing Sheets

LINK CALIBRATION

BACKGROUND

The present invention relates generally to a digital link such as a differential bit link, which may be part of a multi-bit link between two chips. In particular, it relates to methods and circuits for supplying power to one or more transmitters in a link.

FIG. 1 generally shows a conventional transceiver with a transmitter (Tx) 102 and receiver (Rx) 104 coupled to a channel 101 to be linked with a corresponding transceiver at the other side of the channel, e.g., on a different chip. The receiver 104 comprises both current mode logic (CML) and CMOS (complementary metal oxide semiconductor) signal conditioning logic, as does the transmitter 102. The transmitter 102 also has a current mode output driver circuit to drive a transmitted signal over the channel 101. A global Vcc supply 103 supplies the CMOS and CML circuits (including the output driver) with their supply voltages.

A global CML IBias supply 107 provides the CML signal-conditioning logic with a current bias signal ($I_L$Bias), and a current bias source 105 for the driver in the transmitter provides to the driver a current bias signal ($I_D$Bias). The driver bias signal primarily affects the output swing of the transmitter, while the voltage supply (Vcc) and CML bias current ($I_L$Bias) primarily affect the data rate capabilities for the transmitter and receiver.

With power consumption continuing to be an important consideration, new approaches to providing these supplies and/or bias signals may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In some embodiments, provided are methods and circuits to control the power efficiency of a transceiver or a transmitter in a scalable I/O link (a link whose bandwidth and power can be adjusted to meet changing performance demands).

Figure 1:
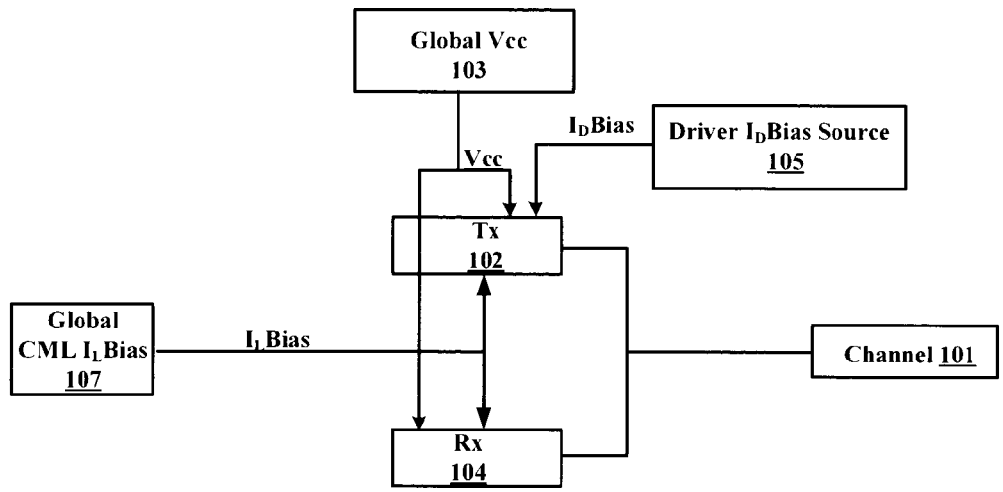
FIG. 1 is a schematic diagram of a conventional link transceiver.
Figure 2:
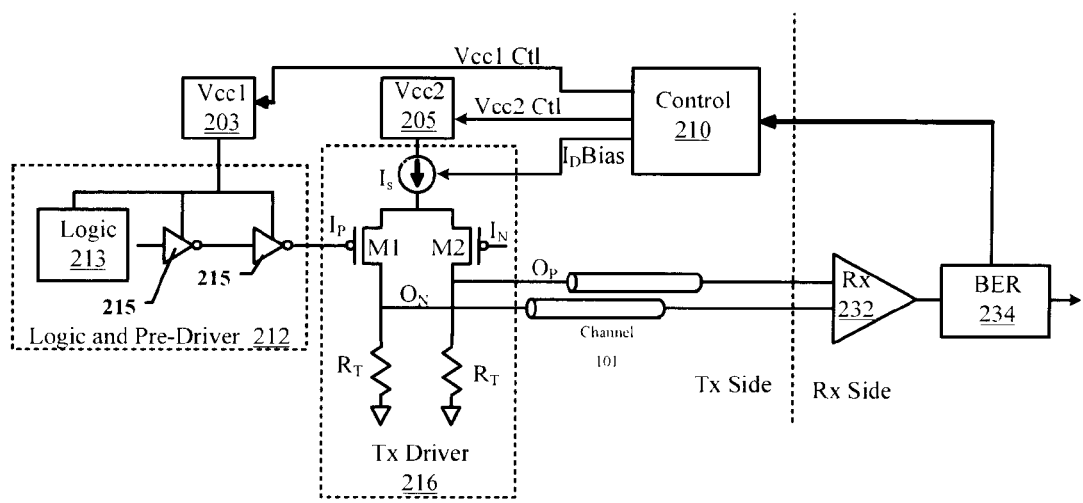
FIG. 2 is a schematic diagram of a circuit for powering and biasing different parts of a transmitter in accordance with some embodiments.

FIG. 2 shows a transmitter circuit with separately controllable supplies (voltage and/or current) for its driver and pre-driver circuits. In this depiction, the transmitter comprises a predriver block 212 comprising signal conditioning and clocking logic 213 and buffers 215) coupled to an output driver 216 to drive differential bit data over a channel 101 to a receiver (Rx) 232.

The predriver circuit 212 may comprise CML and/or CMOS circuits and is provided with adjustable supply (Vcc1) 203. The voltage level of Vcc1 is set by a control circuit 210 (which may actually comprise separate circuits for controlling the indicated voltage and/or bias supplies.) When in operation, the predriver circuit 212 provides bit data to the transmitter driver 216, which then drives it over the channel 101. The rate at which the predriver circuit 212 can provide the data generally correlates with the level of its supply (Vcc1). That is, higher data rates may be provided as Vcc1 goes up.

The transmitter driver 216 is a current mode driver formed from a differential amplifier circuit. The circuit comprises a controllable current source $I_S$, matched differential transistors M1, M2, and termination resistors R1, R2, all coupled as shown. (Note that this is a differential input/differential output circuit, but for convenience, both inputs, $I_P$-$I_N$, are not shown connected to the predriver circuit.) The driver 216 is supplied with a controllable voltage supply (Vcc2) 205. The driver's drive strength is determined by the strength of the current source ($I_S$), which is affected by the strength of supply Vcc2 and its bias control signal $I_D$Bias. The drive strength controls the output swing difference between the output nodes, $O_P/O_N$. For a signal to be properly transmitted to the receiver 232, the swing level needs to be at a sufficient level, the value of which will depend on channel characteristics, receiver parameters, temperature, process variations, and the like.

Since power portions supplied to the predriver circuitry 212 and to the output driver 216 are independently controllable, they can be independently controlled to achieve suitable performance in each block (e.g., suitable data rate in predriver circuitry and sufficient swing level at driver output) without consuming excess power. Note that power adjustment for the driver may be implemented by adjusting the voltage supply Vcc2 and/or adjusting the current source $I_S$. For example, in some embodiments, Vcc1 may be adjustable, Vcc2 could be fixed (albeit possibly at a different level from Vcc1), and the current source $I_S$ could be adjustable.

The control circuit 210 may comprise any suitable circuit or circuits to effectively control Vcc1, $I_S$, and possibly Vcc2 at suitable levels as discussed. In the depicted embodiment, a bit error rate (BER) circuit 234 is included on the receiver side of the link (e.g., on a different chip) to indicate to the control circuit 210 a bit error rate at the receiver 232 when data is transmitted over the channel 101. The BER information could be conveyed back to the control circuit 210 digitally over a suitable link. In some embodiments, the driver current source ($I_S$) is controlled, based on the monitored BER, to achieve a sufficient driver output swing level to attain a suitably low BER. In some embodiments, the current source level may be set based on the BER in response to a test signal being transmitted during a calibration mode, e.g., at start-up. The current source level could, if desired, be adjusted throughout or periodically during link operation.

In some embodiments, the control circuit comprises a circuit (e.g., a frequency to voltage converter) to set the supply (Vcc1) for the predriver circuitry based on a reference frequency (not shown) corresponding to the rate at which the link is to transmit data. For example, the reference frequency could come from the other chip (e.g., in a forwarded clock scheme), or it could come from within the chip including the transmitter. Alternatively, the control circuit could control Vcc1 based on a setting corresponding to the link data rate. Persons of skill will appreciate that there may be several or many ways to control the different supplies and the invention should not be so limited.

Figure 3:
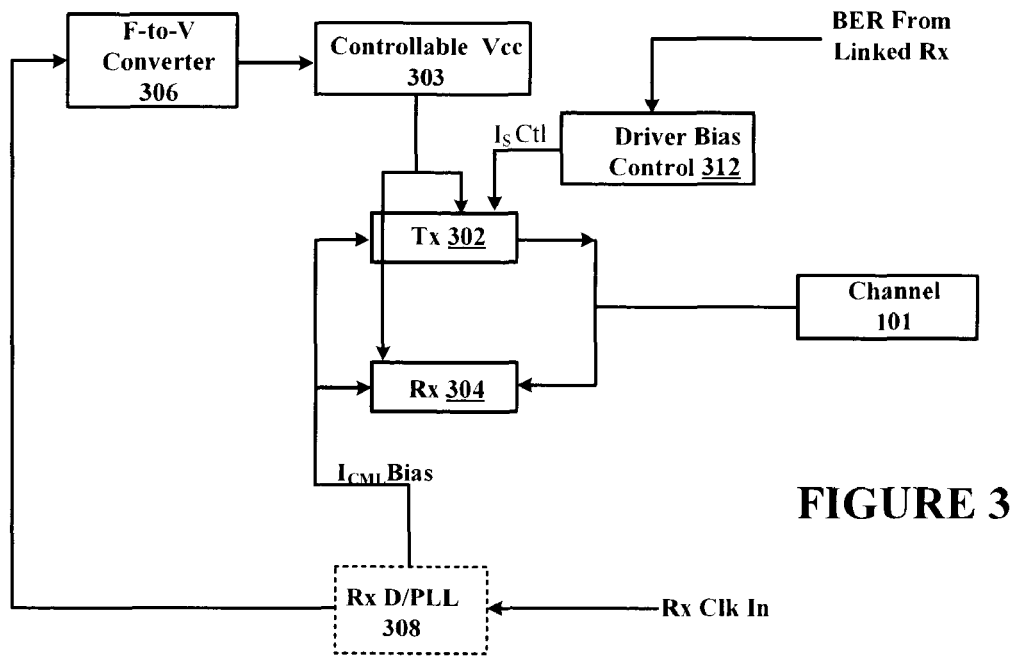
FIG. 3 is a schematic diagram of a circuit for powering and biasing different parts of a transmitter and receiver in accordance with additional embodiments.

With reference to FIG. 3, a transceiver with different supplies (bias and/or or voltage), for different operating requirements, is shown in accordance with additional embodiments. The depicted transceiver comprises a transmitter 302 and receiver 304 coupled to a channel 101, a frequency-to-voltage converter 306, controllable voltage supply (Vcc) 303, driver bias control circuit 312, and receiver D/PLL (delay or phase locked loop circuit) 308, coupled together as shown.

In this embodiment, a common controllable Vcc 303 is used for the supply voltage to both the predriver and driver portions (not separately shown) in the transmitter 302. (In other versions of this embodiment, separate supply voltages could be used.) The driver bias control circuit 312 provides a bias control signal ($I_SCtl$) to the transmitter 302 to control the strength of the current source in its output driver to control its output swing level. In this depiction, there is also shown a CML bias control signal ($I_{CML}Bias$) coupled to the CML circuit components in both the transmitter (excluding output driver which is controlled by $I_SCtl$) and receiver.

Figure 7A:
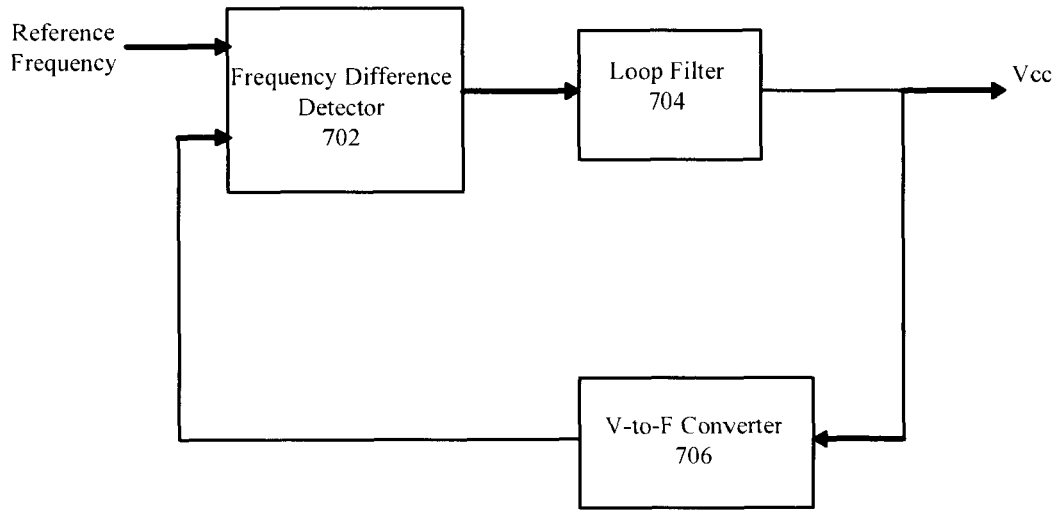
FIG. 7A is a diagram showing a frequency to voltage converter in accordance with some embodiments.

The frequency to voltage (F-to-V) converter 306 generates a reference voltage to control the controllable Vcc 303. In some embodiments, the F-to-V converter is implemented with a supply-regulated VCO (voltage controlled oscillator). While any suitable design may be employed for the F-to-V converter, in some, it may be made from a VCO of a ring oscillator, designed using equivalent (or suitably similar) segments from the transmitter pre-driver output stage. The transmitter's pre-driver output stage will typically be a critical path element of a transceiver as it normally has to support the full rate data stream. Hence, an F-to-V converter with a VCO built from elements using this stage (e.g., with all the critical loading intact and minimal layout modifications) will generally provide an accurate value of a supply voltage suitable for supplying transmitter circuits of the same logic family type (e.g., CMOS in this embodiment). FIG. 7A shows an example of an F-to-V converter of this type.

The driver bias control circuit 312 generates the $I_SCtl$ to control the current source of the output driver in response to monitored signal errors in the link. For example, as with the link of FIG. 2, it could be based on a bit error rate monitored at the other side of the channel. (Note that this bias control signal, $I_SCtl$ is represented as a current signal. However, it, as well as other bias signals in this disclosure, should not be limited in this way. A circuit element may require a voltage or a current signal for its proper control, but this does not imply that a control signal must be of the same type. That is, an intervening element or circuit may be used to properly convert any control signal to a required form. For example, a current source may be controlled with an applied voltage. This voltage could come directly as a voltage signal from a control circuit, or alternatively, it could be generated at the current source input with a current signal from a control circuit, applied to a load disposed at the voltage input, e.g., diode-connected transistor at the current source's control voltage input.)

In the depicted embodiment, a DLL or PLL from the receiver (e.g., used to drive a received clock such as a forwarded clock or the like) is used to provide the input reference frequency to the F-to-V converter 306. It also provides the bias currents ($I_{CML}Bias$) to at least some of the CML components in the transmitter and receiver. Generating the bias currents in this way will typically ensure that the minimum bias current required to support a given bandwidth is provided. In some embodiments (see, e.g., FIG. 4), the D/Pll's VCO control voltage, after the D/PLL has locked, is made available to drive current mirrors used to generate current biases for the CML circuits. (Note that this approach works well when the CML circuits, possibly with the exception of the driver delay cells, amplifiers, etc., use similar circuit topologies such as symmetric loads for example. Note also that the D/PLL may be local (one per bit) or global (one D/PLL shared between several bits in a multi-bit link).

Figure 4:
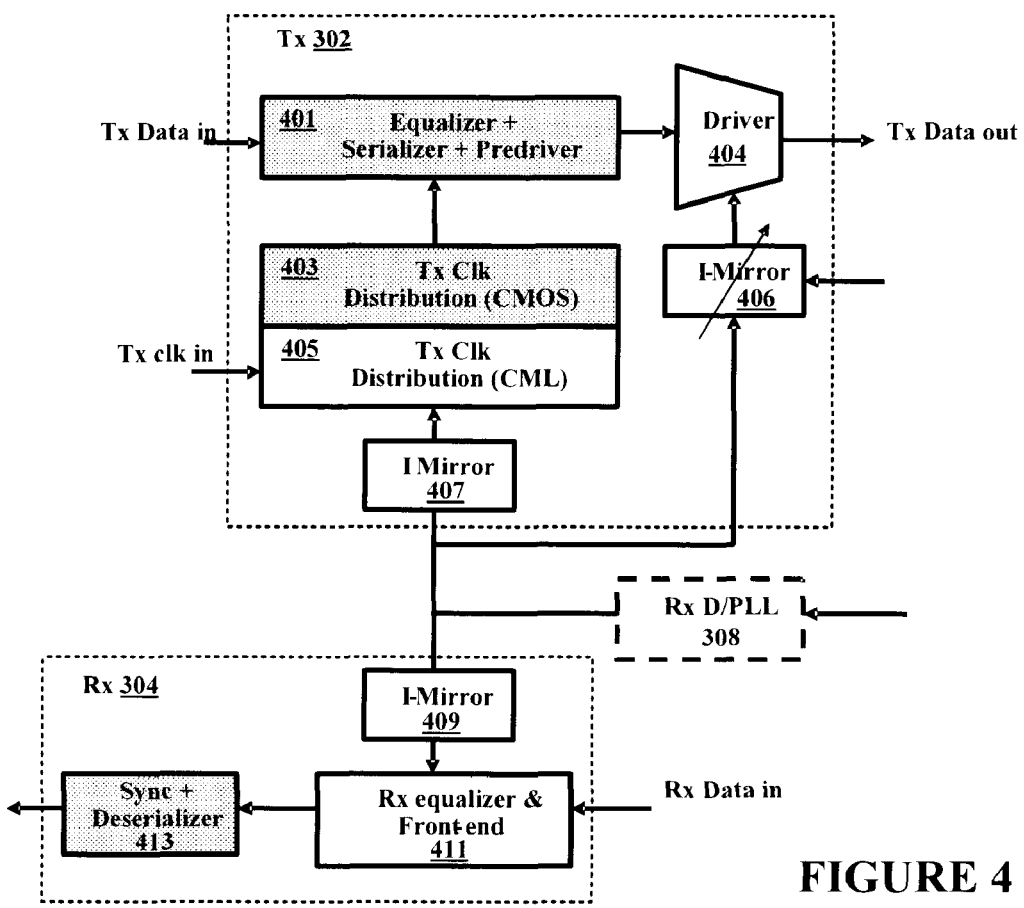
FIG. 4 is a diagram showing aspects of the circuit of FIG. 3 in further detail in accordance with some embodiments.

FIG. 4 shows the transmitter 302, receiver 304 and receiver D/PLL 308 in greater detail with specific circuit blocks for their implementations in accordance with some embodiments. In this figure, shaded blocks in the transmitter and receiver are implemented with CMOS logic elements, while the non-shaded blocks are implemented with CML logic elements. The CMOS blocks could be supplied with a voltage supply based on operational data rate, such as with the controllable Vcc 303. The CML blocks could be powered with the same supply or with a different supply that is fixed or varies in response to operational demands. As seen in this embodiment, the CML circuits are biased with a current bias signal generated with current mirrors that are controlled by the receiver D/PLL 308.

Figure 5:
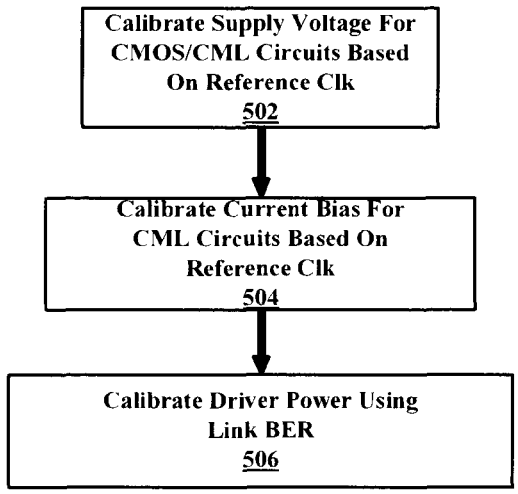
FIG. 5 is a flow diagram of a routine for calibrating the circuits of FIGS. 2 and 3 in accordance with some embodiments.

FIG. 5 shows a process for setting the supply and/or bias levels for a transceiver such as the transceiver in FIG. 3. Initially, at 502, a supply voltage, e.g., at least responsible for powering critical path circuits in the CMOS/CML circuitry, is calibrated (set, adjusted, tuned) in response to a data rate at which the transceiver is to operate. For example, it could be done with a frequency to voltage converter, as discussed above.

Next, at 504, the bias currents for CML circuits in the transceiver, e.g., for TX/RX clock buffers, are calibrated based on a reference clock. This reference clock may be the same one used for the supply calibration just discussed. The circuits for current bias calibration, for example, could comprise CML circuits in the clocking and receiver circuits that are part of the same transceiver.

Figure 6:
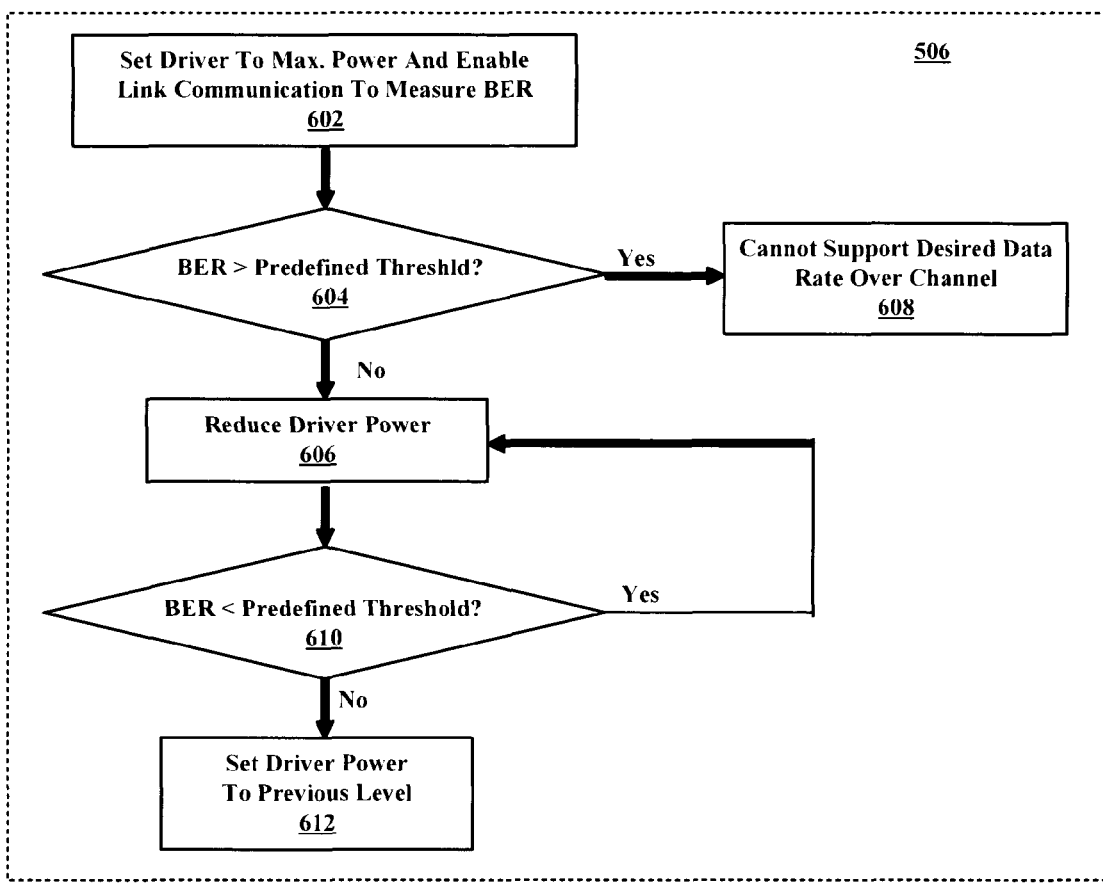
FIG. 6 is a flow diagram showing a method for biasing the driver from the routine of FIG. 5 in accordance with some embodiments.

Finally, at 506, the drive power for the output driver is calibrated based on a monitored (measured, tested, determined) bit error rate at the receiver. Depending on the type of output driver used, this could involve changing a supply voltage or a bias current for the output driver, although with the use of current mode drivers, it will typically involve adjusting the current in its current source. FIG. 6 shows an embodiment for performing calibration on the output driver.

With reference to FIG. 6, at 602, the output driver is set to its maximum power, and the link is activated, e.g., to send a suitable test pattern, to measure a bit error rate (BER). At 604, it determines if the BER is greater than a predefined threshold. If it does exceed this threshold, then at 608, it is recognized that the link cannot support the requested data rate, at least with the current channel under the given conditions. Some other control device or circuit could then act by, for example, requesting a slower data rate or indicating an error message.

On the other hand, if the BER was not greater than the threshold, then the routine proceeds to 606 and decreases the power of the output driver. It then goes to 610 and determines if the BER is less than the predefined threshold. If so, it loops back to 606 to again decrease the power. It continues this until at 610, it is determined that the BER is not less than the threshold. it then goes to 612 and sets the driver bias to the previous level, which is the level that allowed the BER error rate to be just below the threshold. At this level, operation is satisfactory and at the same time, less power will be consumed than if a worst-case guardband were built into a fixed setting.

FIG. 7A shows a suitable F-to-V circuit for the transceivers discussed herein. it generally comprises a frequency difference detector 702, loop filter 704, and voltage-to-frequency converter 706, coupled as shown. Based on an applied input reference frequency, it generates an output control voltage (Vcc) that is proportional to the reference frequency.

Figure 7B:
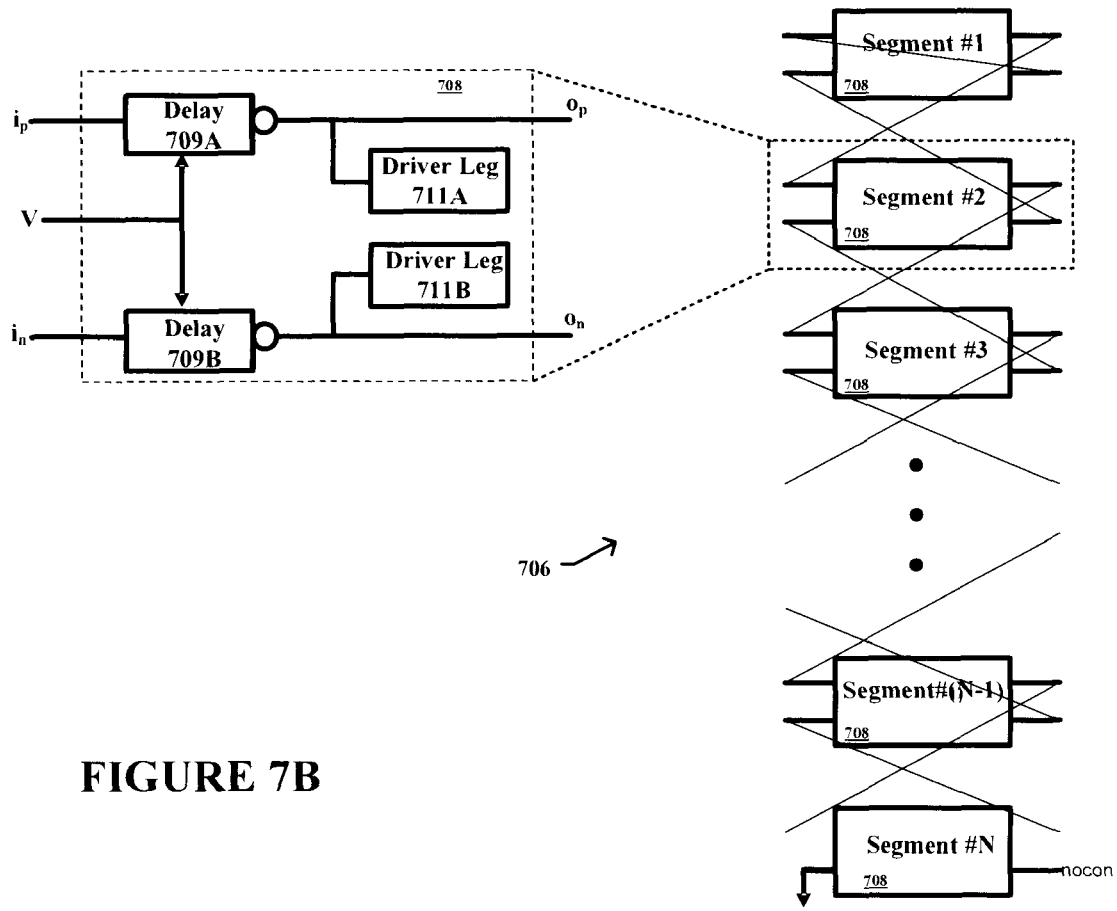
FIG. 7B is a diagram showing a voltage to frequency converter suitable for use with the frequency-to-voltage converter of FIG. 7A, in accordance with some embodiments.

FIG. 7B shows an exemplary voltage to frequency converter circuit 706. It is formed from differential delay stages (segments) 708, which each correspond to a pre-driver output segment. Each segment 708 comprises differential delay elements (e.g., matched MOS transistors) 709 and driver legs 711, coupled as shown with a differential input ($i_p/i_n$) and a differential output ($o_p/o_n$). The segments 708 are coupled together as shown in accordance with a typical differential ring oscillator. The connectivity shown is just one possible way to achieve this.

Figure 8:
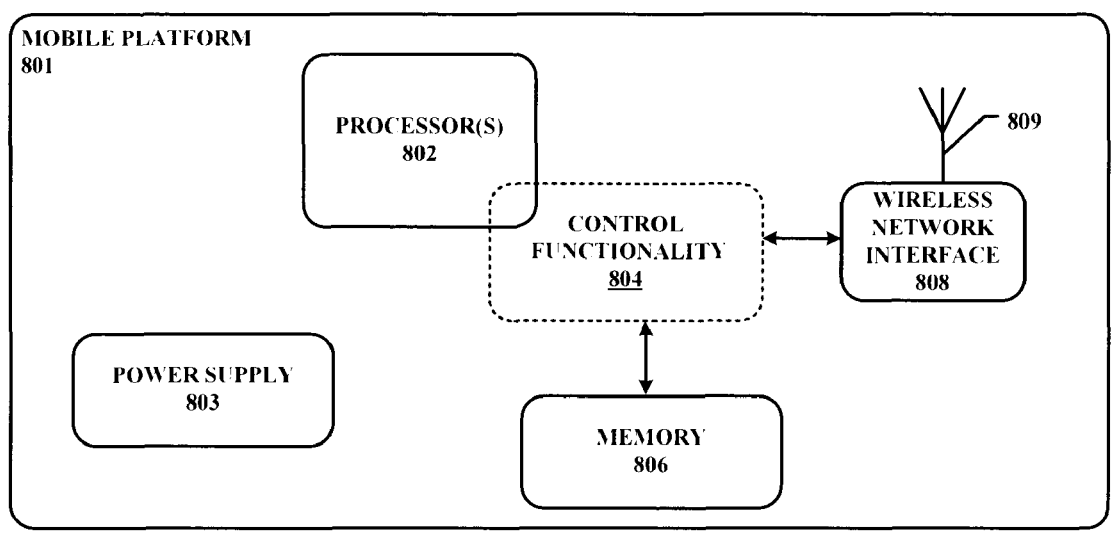
FIG. 8 is a block diagram of a computer system having a link with a transmitter in accordance with some embodiments.

With reference to FIG. 8, one example of a portion of a mobile platform 801 (e.g., computing system such as a mobile personal computer, PDA, cell phone, or the like) is shown. The represented portion comprises one or more processors 802, power supply 803, interface control functionality 804, memory 806, wireless network interface 808, and an antenna 809. The power supply 803, which may include one or more AC adaptors, batteries, and/or DC-DC voltage regulators, provides DC supplies to the platform components. The processor(s) 802 is coupled to the memory 806 and wireless network interface 808 through the control functionality 804. The control functionality may comprise one or more circuit blocks to perform various interface control functions (e.g., memory control, graphics control, I/O interface control, and the like). These circuits may be implemented on one or more separate chips and/or may be partially or wholly implemented within the processor(s) 802.

The memory 806 comprises one or more memory blocks to provide additional random access memory to the processor(s) 802. it may be implemented with any suitable memory including but not limited to dynamic random access memory, static random access memory, flash memory, or the like. The wireless network interface 808 is coupled to the antenna 809 to wirelessly couple the processor(s) 802 to a wireless network (not shown) such as a wireless local area network or a cellular network. The platform comprises at least one link with at least one transmitter with multiple bias and or voltage supplies as discussed above. For example, it could comprise multi-bit links formed from such links to interconnect the memory and control functionality, or wireless network interface and control functionality or processor(s) itself.

The mobile platform 801 may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
a transmitter to drive a differential signal in a link, the transmitter having circuits formed from logic of a first type and circuits formed from logic of a second type, wherein a supply for the first type logic is controlled based on a data rate for the link and a separate supply for the second logic type is controlled based on a monitored error rate for the link.

2. The chip of claim 1, in which the first type logic is CMOS.

3. The chip of claim 2, in which the second type logic is CML.

4. The chip of claim 1, in which the first type logic circuits comprise transmitter pre-drive circuits and the second type logic circuits comprise a current mode differential output driver.

5. The chip of claim 4, in which the supply for the first type logic is a voltage supply, and the separate supply for the second type logic is a current source.

6. The chip of claim 1, in which the error rate is monitored at a receiver linked to the transmitter, the receiver being on a separate chip.

7. A chip, comprising:
a transmitter to drive a signal over a channel to a receiver in another chip, the transmitter having CMOS circuits and CML circuits, wherein a voltage supply for the CMOS circuits and a bias current for the CML circuits are controlled based on a data rate for the transmitter; and
a frequency to voltage converter driven by a reference frequency corresponding to the data rate to control the voltage supply for the CMOS circuits.

8. The chip of claim 7, in which the frequency to voltage converter comprises a voltage to frequency converter having similar characteristics with at least some of the CMOS circuits in the transmitter.

9. The chip of claim 7, in which the reference frequency is derived from a D/PLL associated with a receiver that is part of a transceiver for the transmitter.

10. The chip of claim 7, in which the transmitter comprises a current mode output driver having a controllable current source to control its drive strength.

11. The chip of claim 10, in which the current source is controlled based on an error rate monitored at a receiver that is communicatively linked with the transmitter.

12. The chip of claim 11, in which the output driver is a differential current mode driver.

13. A mobile platform system, comprising:
(a) a processor chip having a transmitter to drive a signal over a channel to a linked receiver, the transmitter having:
CML circuits controlled with a bias current based on a data rate for the transmitter, and
an output current mode driver with a current source controlled to achieve a sufficiently low monitored error rate at the linked receiver;
(b) a control functionality chip having the linked receiver to receive data from the processor; and
(c) an antenna to communicatively link the processor to a wireless network.

14. The system of claim 13, in which the transmitter comprises CMOS circuits with a voltage supply that is controlled based on the data rate.

15. The system of claim 14, comprising a frequency to voltage converter driven by a reference frequency corresponding to the data rate to control the voltage supply for the CMOS circuits.

16. The system of claim 15, in which the frequency to voltage converter comprises a voltage to frequency converter having similar characteristics with at least some of the CMOS circuits in the transmitter.

17. The system of claim 15, in which the reference frequency is derived from a D/PLL associated with a receiver that is part of a transceiver for the transmitter.

18. The system of claim 13, in which the control functionality chip performs memory and graphics control functions.

19. The system of claim 13, comprising an input/output control chip with a wireless interface controller coupled between the antenna and processor to link the processor to the wireless network.

* * * * *